July 15, 1930.    W. A. COGSHALL    1,770,461
DEVICE FOR DETERMINING SOLAR ALTITUDES
Filed Nov. 7, 1927
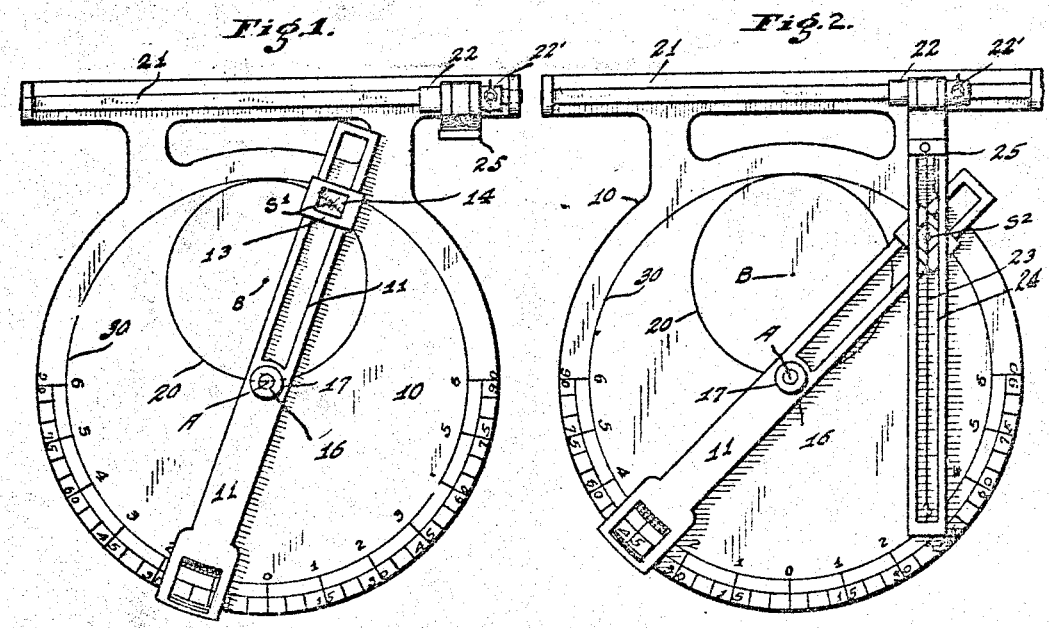
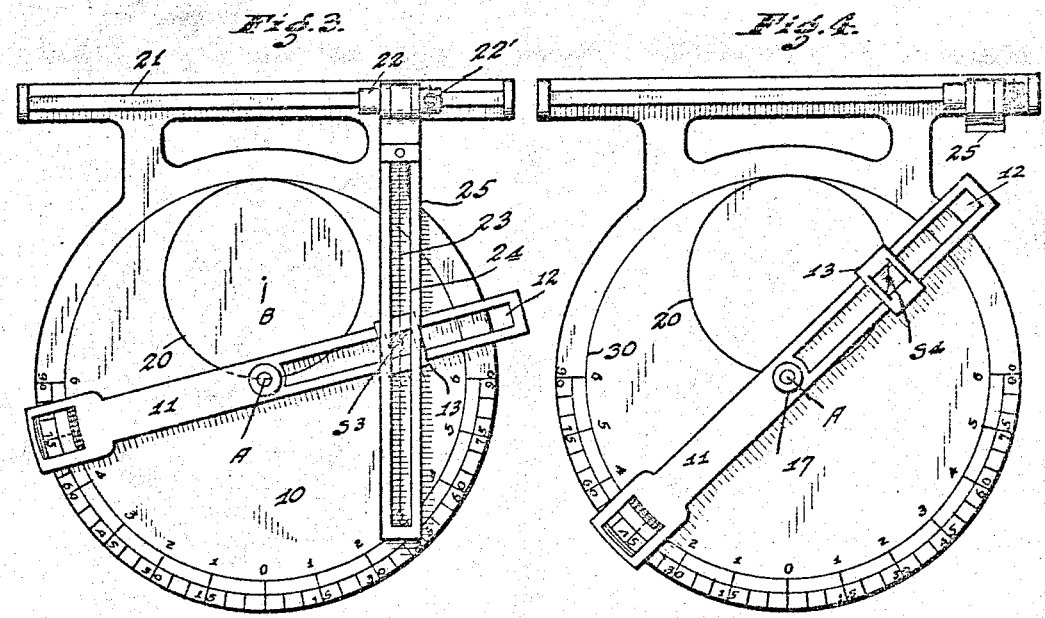
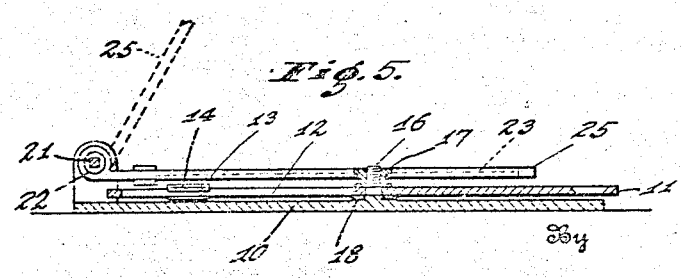
Inventor
WILBUR A. COGSHALL Patented July 15, 1930

1,770,461

UNITED STATES PATENT OFFICE

WILBUR A. COGSHALL, OF BLOOMINGTON, INDIANA

DEVICE FOR DETERMINING SOLAR ALTITUDES

Application filed November 7, 1927. Serial No. 231,491.

Navigators and other observers, in determining their position upon the earth, frequently use a method in which the observed altitude of some celestial body, usually the sun, is compared with a calculated altitude. In using this method, the first step is the approximation of the observer's latitude and longitude. With these values assumed, the observer calculates what the altitude of the sun should be in the assumed position at the time of the observation, and by a comparison of this calculated altitude with the actual altitude of the observer, he is enabled to correct the original approximations of his latitude and longitude.

It is the object of my invention to produce a device by the use of which there may be obtained without calculation the altitude of the sun at the assumed position at the time of the observation.

I accomplish the above object by mounting on a plate a pivoted arm which has a slider bearing an index point, and I provide a straight-edge movable relatively to the plate in a direction perpendicular to itself. I provide the plate with markings by means of which the pivoted arm may be set to various angular positions and which will enable the operator to set the slider with the index point at desired distances from the pivotal axis of the arm.

The accompanying drawing illustrates my invention: Figs. 1 to 4 are plan views of my device with the various parts in different positions of adjustment, and Fig. 5 is a vertical section on the line 5—5 of Fig. 1.

The base plate 10 of my device has pivotally mounted upon it an arm 11 one end of which is provided with a radially extending slot 12. On this slotted portion of the arm I mount a slider 13 having in line with the slot 12 an opening closed with a sheet 14 of celluloid, glass, or similar transparent material. In the center of this transparent plate 14 is an index point S which, as the slider 13 is moved along the arm 11, travels in a radial path.

The pivotal mounting of the arm is desirably such that the arm can be clamped in various positions of angular adjustment. To this end, I provide the plate with an upwardly projecting stud 16 which passes through a hole in the arm 11 and above such hole is provided with a clamping nut 17. Desirably, a spacer or washer 18 is inserted between the arm 11 and the plate 10 in order to provide between such two parts a clearance for the slider 13.

Inscribed on the face of the plate 10 is a circle 20 so disposed that it passes exactly through the center of the stud 16 about which the arm 11 pivots. Mounted in a position to clear the arm 11, I provide a straight guide rod 21 disposed perpendicularly to the line joining the center of the circle 20 and the center of the stud 16; and on this guide rod 21 I mount a slidable member 22 which preferably is provided with a set screw 22' in order that it may be clamped in definite position on the rod 21.

Carried by the member 22 I provide a straight-edge adapted to extend over the plate 10 perpendicular to the guide rod 21 and parallel to the line joining the center of the circle 20 with the center of the pivot stud 16. This straight-edge is conveniently a fine wire or hair 23 stretched along a slot 24 in a frame 25 which is pivotally mounted on the slidable member 22 in order that it may be lifted upward to facilitate adjustment of the arm 11.

The plate 10 is desirably circular in shape and is provided around its circumference with two sets of graduations by means of which the arm 11 may be set at various angular positions on the plate. One set of these graduations gives readings in ordinary angular measure while the other set represents 24 equal divisions of the circumference corresponding to hours, each of said sub-divisions being further divided to give readings in minutes. If desired, the end of the arm 11 which overlies such graduations may be provided with supplementary graduations by means of which vernier readings may be made.

Both sets of the graduations just described are so arranged that the index point S will be over the line through the center of the circle 20 and the center of the pivot stud 16 when the arm 11 is set at the zero point of the graduations.

Both series of graduations extend in consecutive order in opposite directions from their respective zero points. As shown in the drawing, the arm 11 is a straight arm and the zero points of both sets of graduations are located on the line through the center of the circle 20 and the center of the stud 16. This, however, is not at all essential to my invention.

As a practical illustration of a problem solved with my device, let it be assumed that the observer approximates his position in latitude 40° and longitude such that the hour angle of the sun at the time of the observation is three hours. Let it be further assumed that the observation is made on such a date and at such a time that the sun's declination (obtained from a suitable astronomical table) is +20°.

In determining the calculated altitude of the sun at the approximated position, the observer sets the arm 11 at an angle corresponding to the sun's declination. Under the conditions above assumed, this declination is 20°, and the arm 11 is shown in Figure 1 set at that angle. With the arm held in this position the slider 13 is adjusted to bring the index point S over the circumference of the circle 20. Without disturbing the slider 13, the arm 11 is now set at the hour angle, which under the assumed condition is three hours. The arm is shown in this position in Fig. 2. During these operations, the frame 25 is conveniently swung about its axis of pivotal mounting so that it will not interfere with the setting of the arm and slider. The frame is now lowered, and adjusted along the guide rod 21 until the wire 23 lies directly over the index point S, and the set screw 22' is tightened to hold the member 22 and frame 25 in that position. The arm 11 is now adjusted to the azimuth of the sun, as obtained from suitable astronomical tables, at the approximated position of the observer and at the time of the observation. With the arm held in this setting, the slider 13 is adjusted to bring the index point S under the wire 23. The position of the parts in this setting is illustrated in Fig. 3. The wire 23 is no longer needed, and the frame 25 can therefore be swung upward to avoid interference with subsequent adjustments. Without disturbing the slider 13, the arm 11 is now rotated to bring the index point S over the circumference of the circle 20, as shown in Fig. 4. The angular position of the arm 11 in this setting corresponds to the altitude of the sun, which is readable upon the outer set of graduations. Under the conditions assumed, the altitude obtained will be 46° 47′ 26″.

In its various settings, the index point S corresponds to the position of the sun as seen by a hypothetical observer located outside the celestial sphere. To aid in explaining the various aspects of the sun as seen by such observer, I have shown in the drawings a circle 30 having its center at the center of the stud 16 and having a radius equal to the diameter of the smaller circle 20. I have indicated the successive positions of the index point on the slider 13 by the designations $S_1$, $S_2$, $S_3$, and $S_4$. The center of the stud 16 I have denoted as A and the center of the smaller circle 20 as B.

To an observer who is located on the earth's axis projected and outside the celestial sphere and who moves with the earth, the point A will represent the pole and the circle 30 the celestial equator. The sun in its daily rotation will appear to describe a circle whose apparent radius is proportional to the cosine of the sun's declination. The first setting of my device shown in Fig. 1 places the point $S_1$ at a distance from the center A equal to the radius of the circle 30 multiplied by the cosine of the angle at which the arm 11 is set—i. e., at a distance from the center A corresponding to the radius of the apparent path of the sun's travel. The position of the sun in its path of movement depends upon the hour angle, and the point $S_2$ in Fig. 2, therefore, corresponds to the position of the sun as seen by the hypothetical observer at the time of the observation. If, with this point located, the observer is assumed to move in the plane of the meridian until directly over the zenith, the circle 30 will then correspond to the horizon. During the movement of the observer from the point over the pole to the point above the zenith, the sun would appear to move in a line parallel to the plane of the meridian, this line corresponding to the wire 23 as set in Figs. 2 and 3. The distance of this line from the center of the plate will evidently be proportional to the sine of the angular distance of the sun from the meridian. The position of the sun along this line may be determined from the azimuth, this determination having been made by the setting illustrated in Fig. 3. The length of the line $A S_3$ now equals the radius of the circle 30 multiplied by the cosine of the altitude; and the altitude may be determined by swinging the arm 11 to the position illustrated in Fig. 4 in which the point $S_4$ lies directly over the circumference of the circle 30, and the angle of the arm 11 as thus set indicates the altitude.

The altitude as obtained from my instrument is then compared with the observed altitude, and the observer is enabled to make a correction in this approximated position.

To avoid errors due to parallax in setting the slider 13 and the straight-edge 23, I may provide the plate 10 with a reflecting surface in order that the eye of the operator may be brought directly over the index point S or the wire 25.

It will be noted that the circle 20 is employed solely for the purpose of setting the index point S at a distance from the center of the stud 16 proportional to the cosine of the angle which the slider-bearing portion of the arm 11 makes with the line joining the center of the stud and the center of the circle 20. Other means may be employed for so setting the index point S; but the circle 20 is a convenient means and avoids the expense which would be involved in graduating the arm 11 to indicate cosines directly.

I claim as my invention:—

1. A device for determining solar altitudes, comprising a plate, an arm pivotally mounted on said plate, a slider radially movable on said arm and having an index point, there being graduations on said plate for setting said arm at measured angles to a predetermined zero position, said device having means for locating said slider in positions at which the distance between said index point and the axis of rotation of said arm will be proportional to the cosines of predetermined angles, a straight-edge disposed parallel to the radial path of movement of said index point when said arm is in zero position, and means for guiding said straight-edge for movement over said plate in a direction perpendicular to itself.

2. A device for determining solar altitudes, comprising a plate, an arm pivotally mounted on said plate, a slider radially movable on said arm and having an index point, there being graduations on said plate for setting said arm at measured angles to a predetermined zero position, said plate having inscribed upon it a circle whose center lies in the path of movement of said index point when said arm is in zero position and whose circumference passes through the axis of pivotal mounting of said arm, a straight-edge disposed parallel to the radial path of movement of said index point when said arm is in zero position, and means for guiding said straight-edge for movement over said plate in a direction perpendicular to itself.

3. A device for determining solar altitudes, comprising a plate, a straight-edge, means for guiding said straight-edge for movement over said plate always parallel to itself, said device being provided with means for indicating a setting of said straight-edge such that its distance from a predetermined point on said plate will be proportional to the sine of the angular distance of the sun from the meridian and for indicating the angle whose cosine is similarly proportional to the length of a line extending from such predetermined point to said straight-edge and making with such straight-edge an angle equal to the azimuth of the sun, said means including a member pivotally mounted on said plate.

4. A device for determining solar altitudes, comprising a plate, a member rotatable over said plate, said member being provided with an index point, said device being provided with means for indicating a setting of said member such that the distance between said index point and a predetermined straight line on said plate will be proportional to the sine of the angular distance of the sun from the meridian, said device including a straight-edge and provisions for guiding said straight-edge over said plate and for maintaining it always parallel to said predetermined straight line.

In witness whereof, I, WILBUR A. COGSHALL, have hereunto set my hand at Bloomington, Indiana, this second day of November, A. D. one thousand nine hundred and twenty-seven.

WILBUR A. COGSHALL.